United States Patent [19]
Itoh et al.

[11] Patent Number: 5,490,287
[45] Date of Patent: Feb. 6, 1996

[54] WIRELESS COMMUNICATION DEVICE AND PRINTING SYSTEM USING THE SAME

[75] Inventors: Nobuyasu Itoh, Yokohama; Shigeru Ueda, Wakoh, both of Japan

[73] Assignee: Canon Kabushiki Kaisha, Tokyo, Japan

[21] Appl. No.: 181,870

[22] Filed: Jan. 13, 1994

Related U.S. Application Data

[63] Continuation of Ser. No. 858,071, Mar. 26, 1992, abandoned.

[30] Foreign Application Priority Data

Apr. 4, 1991 [JP] Japan .................................. 3-071690

[51] Int. Cl.$^6$ ..................................................... H04B 7/24
[52] U.S. Cl. ........................... 455/66; 455/67.1; 455/69; 455/115; 358/442
[58] Field of Search ............................ 455/69, 67.1, 92, 455/88, 115, 127, 66, 57.1, 56.1; 178/4.1 A; 358/442, 468; 379/58, 59, 60; 400/62

[56] References Cited

U.S. PATENT DOCUMENTS

| | | | |
|---|---|---|---|
| 4,613,990 | 9/1986 | Halpern | 455/57.1 |
| 4,675,863 | 6/1987 | Paneth et al. | 379/59 X |
| 4,749,825 | 6/1988 | Stewart et al. | 178/4.1 A |
| 4,777,653 | 10/1988 | Bonnerot et al. | 455/69 |
| 5,128,959 | 7/1992 | Bruckert | 455/67.1 |

FOREIGN PATENT DOCUMENTS

| | | |
|---|---|---|
| 2286328 | 5/1988 | Japan . |
| 2128882 | 5/1990 | Japan . |
| 2128881 | 5/1990 | Japan . |

OTHER PUBLICATIONS

"A Television Facsimile System" by Dr. Sueyoshi Soejima; JEE Journal of Electronic Engineering; vol. 7, No. 48, Nov. 1970, Tokyo, Japan pp. 24–31.

Primary Examiner—Edward F. Urban
Assistant Examiner—Philip J. Sobutka
Attorney, Agent, or Firm—Fitzpatrick, Cella, Harper & Scinto

[57] ABSTRACT

In a network of wireless communication devices, each device has a unit for transmitting information, a unit for variably controlling the transmission power for transmission of information, a unit for receiving information transmitted, and a unit for controlling the other units. Each device shifts the transmission power to a level proper to a current receiver device.

14 Claims, 6 Drawing Sheets

WIRELESS COMMUNICATION DEVICE AND PRINTING SYSTEM USING THE SAME

This application is a continuation of application Ser. No. 07/858,071 filed Mar. 26, 1992, now abandoned.

BACKGROUND OF THE INVENTION

1. Field of the Invention

The present invention relates to a wireless communication device for transmitting and receiving data, for example, by radiowaves, and to a printing system employing such a device.

2. Description of the Related Art

In a network of conventional wireless communication devices, the transmission power of each device is set strong enough to be received by the farthest device. A network of wireless communication devices is illustrated in FIG. 5, in which a symbol "0" indicates a wireless communication device. The transmission power of a device 10 is set so that a device 1 farthest from the device 10 can receive the data sent by the device 10. The transmission power of a device 4 can be set lower than that of the device 10, since the device 4 is located substantially at the center of the network so that the distance from the device 4 to the farthest device therefrom is shorter than the distance from the device 10 to the device 1.

Thus, in a network, different devices may have different transmission power levels, according to their locations in the network.

Such a network or device, however, has problems as described below.

Devices located in the peripheral area of the network, such as the device 10 in FIG. 5, use significantly more power than devices located in the central area of the network, such as the device 4. For example, the device 10 always uses the same high power to transmit data to any device, whether to the farthest device 1 or to the neighboring devices 4, 7 and 8. Also, the high power radiowaves sent out by the device 10 naturally reach the area outside the network (e.g., the area below the unit 10 in FIG. 5) as well, so that communication between the devices in the network can be received by a device outside the network. This becomes a significant problem when confidential data is communicated in the network. As a result, security protection becomes difficult.

SUMMARY OF THE INVENTION

An object of the present invention is to solve the above problems by providing a wireless communication device which changes its transmission power according to a current receiver, for example, to a level just high enough to communicate with the current receiver device. Thus, a device according to the present invention requires less total power and contributes to network security.

Another object of the present invention is to provide a printing system which uses such a device and thus does not require high power.

Other objects, features and advantages of the present invention will become apparent in the attached drawings, the detailed description of the preferred embodiments and the claims.

DETAILED DESCRIPTION OF THE PREFERRED EMBODIMENTS

The preferred embodiments of the present invention will be described hereinafter with reference to the drawings.

[Embodiment 1]

Figure 1:
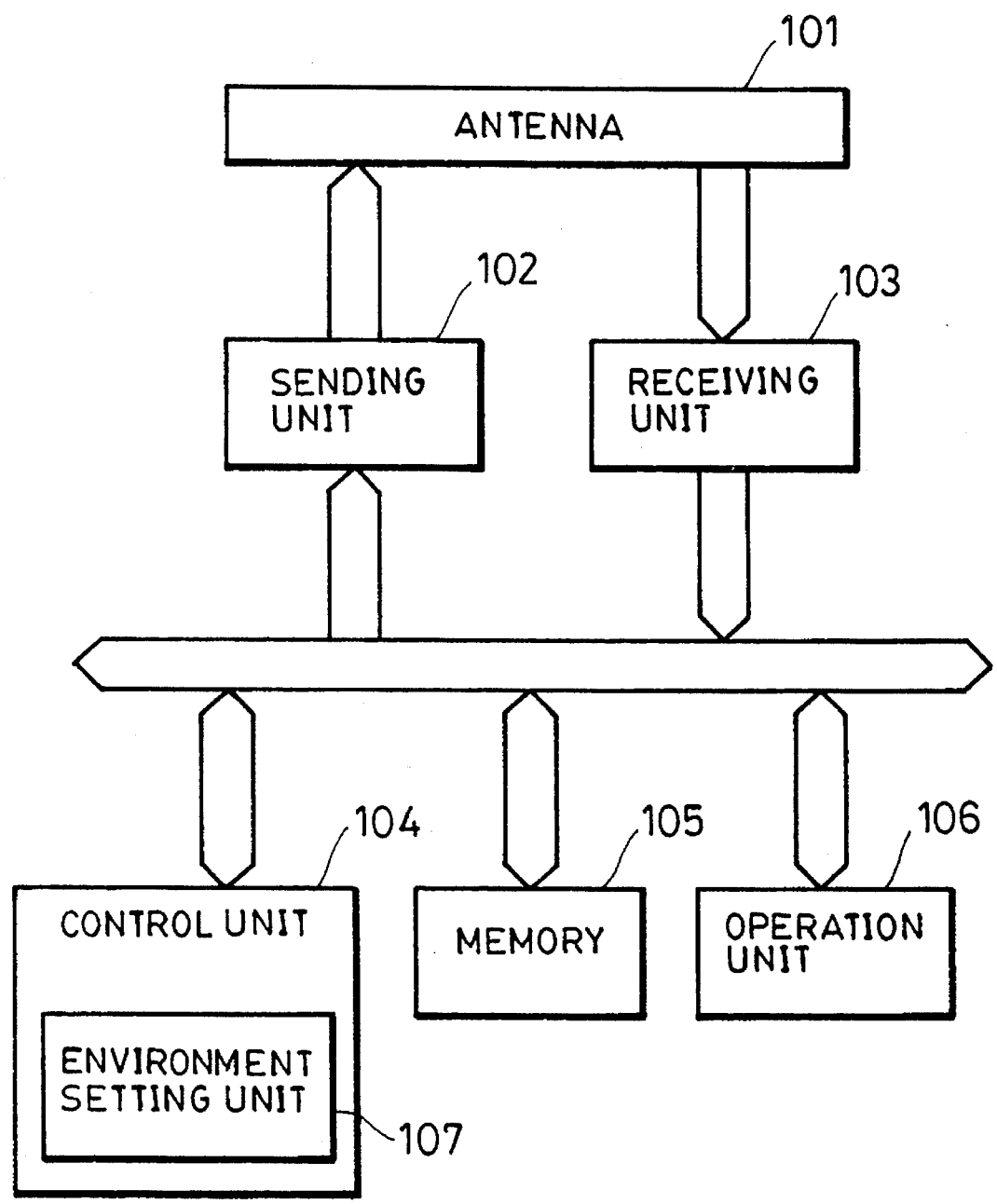
FIG. 1 is a block diagram of a communication device according to one embodiment of the present invention.

FIG. 1 shows a communication device comprising: an antenna 101 for transmitting and receiving radiowaves; a sending unit 102 for sending out data; a receiving unit 103 for receiving data; a control unit 104 having an environment setting unit 107; a memory 105 for storing data; and operation unit 106. Each of such devices in a network (FIG. 5) has an identification code.

Figure 2:
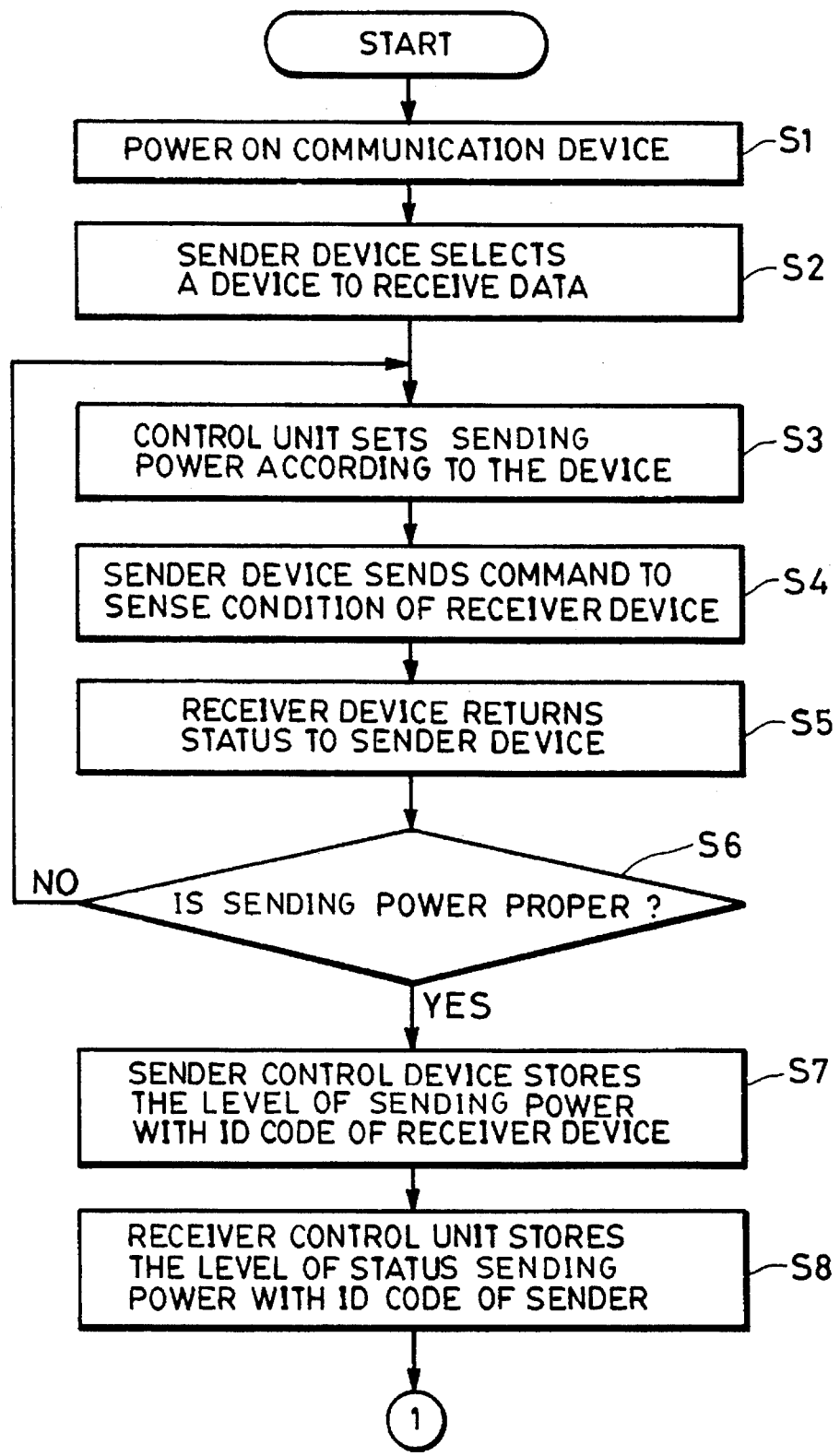
FIGS. 2 and 3 show a flowchart illustrating the operation of the device shown in FIG. 1.

Referring to FIG. 2, when a communication device in a network is powered to transmit data in Step S1, a receiver is selected from the other communication devices in the network (Step S2). Then, the sender device determines in Step S3 the minimum transmission power required for the transmission of the data to the receiver device. This operation may be carried out either serially for all the other devices when powered, or specifically for the receiver device when data is to be transmitted.

In detail, the sender device sends the receiver device the command to sense its own state(Step S4), and judges whether the transmission power is proper or not based on the status which the receiver sends to the sender (Steps S5 and S6). When it is judged to be improper, such as when the sender receives a status signal indicating that the reception has been failed or when the sender does not receive a status signal from the receiver, the sender changes the level of transmission power to send the command again in Step S3. Alternatively, the sender may send, together with the command, data regarding the transmission power level to transmit the command, and the receiver changes its transmission power level, according to the received data, for example, to send a status signal to the sender.

When the transmission power level is judged to be proper in Step S6, the control unit 104 of the sender device stores the data regarding the transmission power level (Step S7), in association with the ID code of the receiver device. On the other hand, the control unit 104 of the receiver also stores the data regarding the own transmission power level of the sender, in association with the ID code of the sender (Step S8). The transmission power level is stored in the control unit 104 of the receiver, based on, for example, the above-mentioned data regarding the transmission power received, together with the command, from the sender. In such a way, the environment setting unit 107 included in the control unit 104 of each device stores a table containing the transmission power levels corresponding to the other devices.

Figure 3:
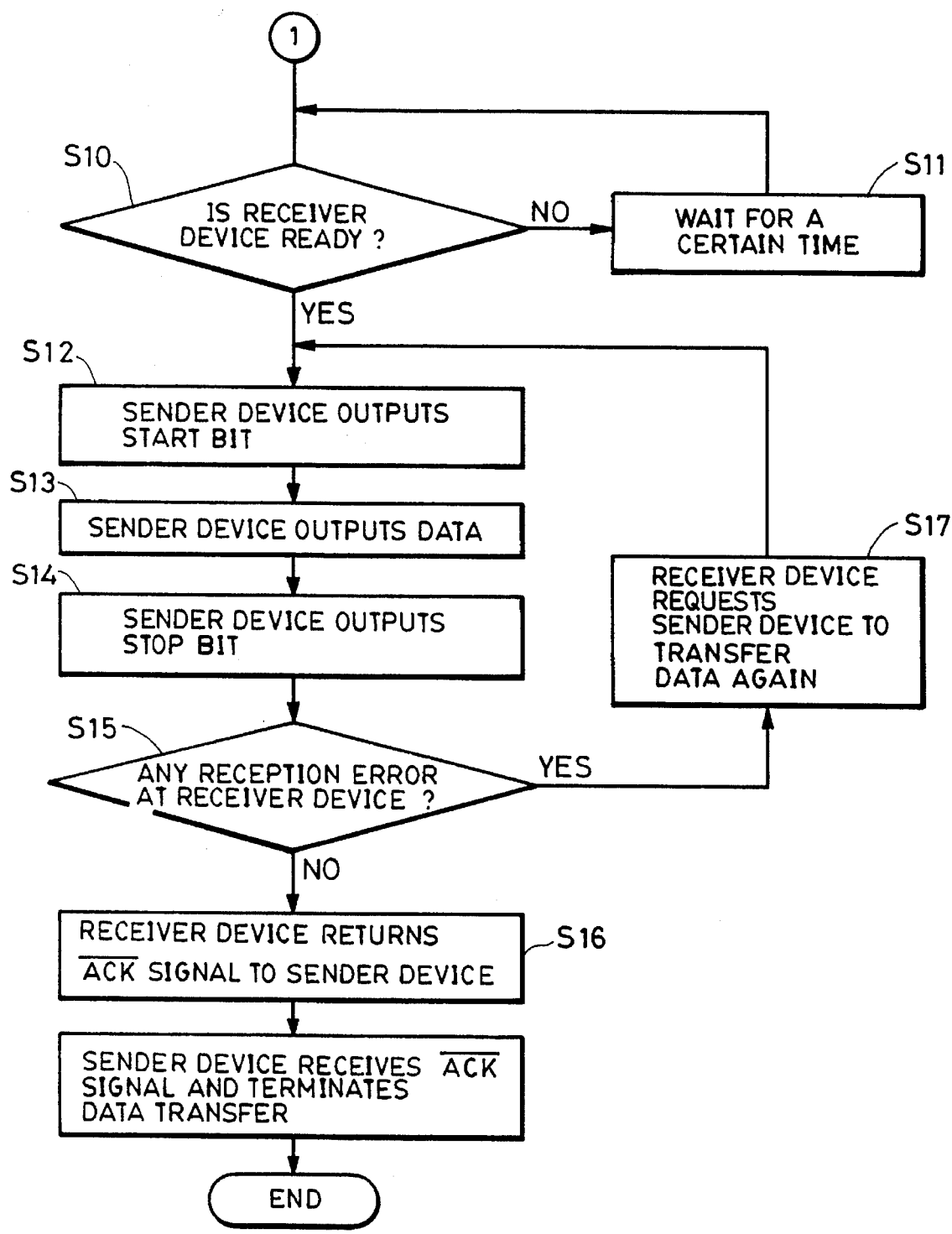
Figure 4:
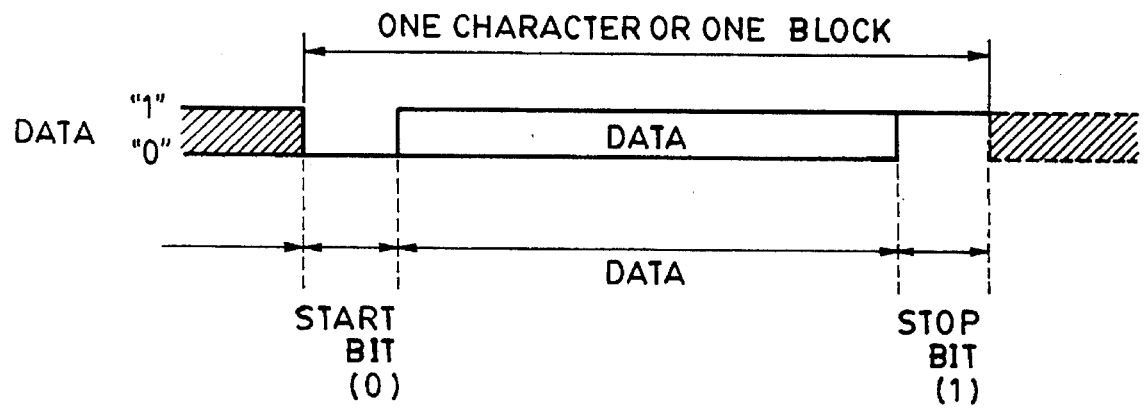
FIG. 4 is a time chart of transfer data.

Referring to FIG. 3, the sender device examines whether the receiver device is ready for receiving or not (Step S10). When the receiver is not ready, the sender waits for the receiver to be ready (Step 11). When the receiver is ready, the sender sends out the start bit to the receiver (Step S12) so that data transmission will start. Then, the sender transmits the data to the receiver (Step S13) and then, sends out the stop bit (Step S14). Data may be sent out by the unit of a character or a block of several characters, as shown in FIG. 4.

Next, the sender device judges whether any reception errors have occurred in Step S15. For this judgment, various methods can be used, such as, a parity check in which a parity bit is added to each of the data, a successive sending check in which data is sent twice for error detection, an inverse check in which data and the inverse of such data (each bit, "1" or '0", of the data is inverted) are used as the check codes, etc.

Only when it is judged that there is no reception error, does the receiver send the ACK signal to the sender (Step S16). When a reception error is found, the receiver requests the resending of the data in Step S17, and the sender sends the data again via Step S12. In such a case, the transmission power level may be changed. If it is changed, the data of the transmission power level stored in the environment setting unit 107 is updated accordingly and the operation illustrated in FIG. 2 may be omitted. The procedure as described above is repeated for data transfer (If the data transfer is performed by the unit of a character, data transfer operation is performed several times according to the amount of data to be transferred).

[Embodiment 2]

To handle a state where a plurality of communication devices simultaneously transmit data to one device in a network, a wireless communication device according to this embodiment is equipped with a function such as interruption or polling; thereby, the receiver device receives data successively from the sender devices according to the priority of each sender device, or the receiver accesses to a sender in order to request a data transfer when the receiver idles. Further, the polling enable devices may be equipped with a function such that a receiver remotely controls (on radiowaves) the transmission power of a sender during the setting of the transmission power.

If a wireless communication device is added to a network of such wireless communication devices, each existing device stores the data of the distance to the added device and the ID code of the added device, and the added device stores the data of the distance to each of the existing devices and the ID code thereof. The ID codes and the distance data are stored in the environment setting unit 107 (e.g. an E²PROM) of the control unit 104 of each device. As an alternative, to transmit data to an uncataloged device (newly added to the network), a sender device and the uncataloged device (the receiver) may carry out the operation shown by the flowcharts in FIGS. 2 and 3, starting with the lowest transmission power level, and the sender and/or the receiver automatically catalog each other.

As described above, since a wireless communication device according to the present invention uses a transmission power level specific to a receiver device, such a device requires less total power and makes it difficult for an outside device to receive a communication of the network. Also, since the transmission power is kept relatively low, wireless interference is substantially prevented.

Since the proper transmission power level varies in proportion to the distance to receivers, the initial value for the transmission power can thus be set. Also, since a device according to the present invention adjusts the transmission power to a proper level which varies depending on external noises, location factors, weather conditions, etc., the reliability or quality of communication is upgraded.

[Embodiment 3]

Figure 5:
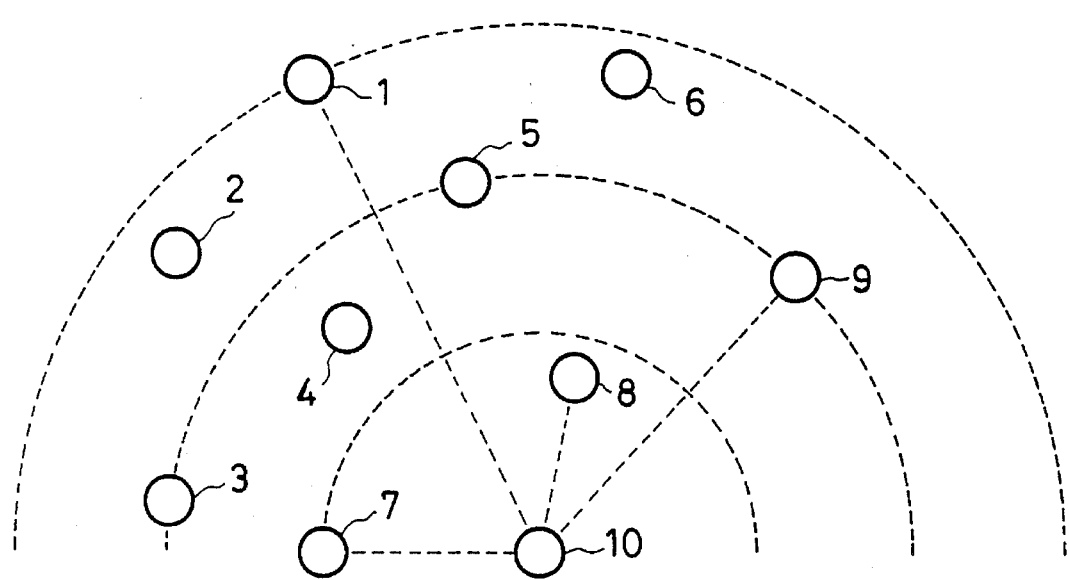
FIG. 5 illustrates a network of devices according to the present invention.

A wireless communication device according to the present invention can be employed in a communication system to transmit print data from a host computer to a printer. According to this embodiment, one host computer (the sender) transmits print data to a plurality of printers (the receivers) on radiowaves. In FIG. 5, the host computer may be the device 10, and the printers may be the other devices 1 to 9.

Figure 6:
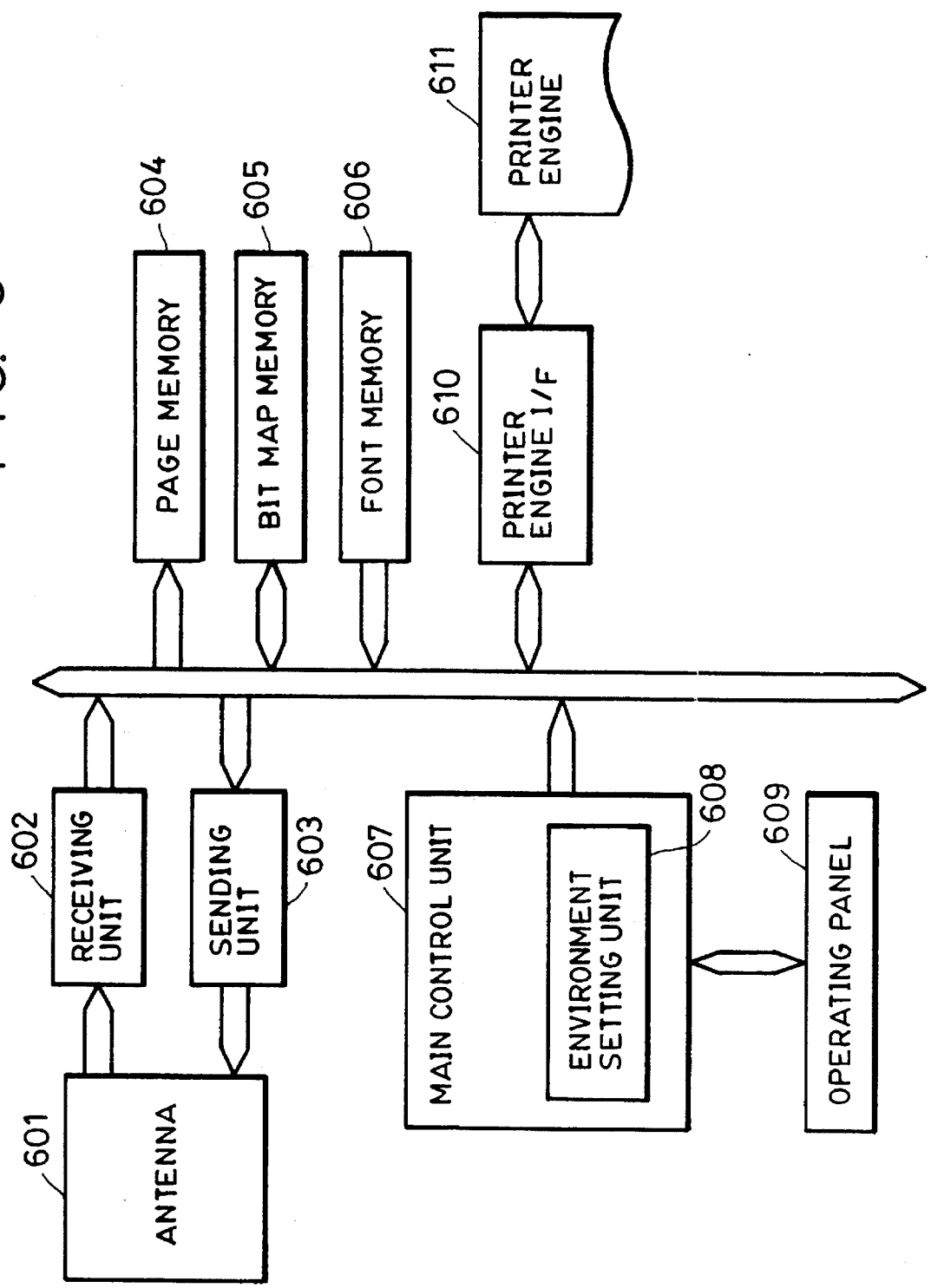
FIG. 6 is a block diagram of a communication device used in a printer of a printing system according to another embodiment of the present invention.

Referring to FIG. 6, the printer having an interface for wireless communication comprises: an antenna 601; a receiving unit 602; a sending unit 603; a page memory 604; a bit map memory 605; a font memory 606; a main control unit 607; an environment setting unit 608; an operating panel 609; a printer engine interface 610; and a printer engine 611.

Data transmitted from the host computer is received by the antenna 601 and sent through the receiving unit 602 to be temporarily stored in the page memory 604. When data for one page is accumulated in the page memory 604, the main control unit 607 reads from the font memory 606 the bit map data corresponding to the character data stored in the page memory 604 and develops the bit map data as a dot pattern in the bit map memory 605. Then, the main control unit 607 reads the developed dot pattern data from the bit map memory 605 and sends the data to the printer engine interface 610. The printer engine 610 converts the word (16 bits) or byte (8 bits) data to serial data (P-S conversion) and outputs the converted data as a VIDEO signal to printer engine 611. Printing is thus started. Also, the main control unit 607 sends the status of the printer (e.g. READY, PAPER OUT, WARMING UP) through the sending unit 603 to the host computer. Paper size, the attributes of the print characters (typeface, size, etc), the number of copies, etc. can be determined according to the preferences of a user by operating the operating panel 609. The ID code of the printer and data of the distance to the host computer are stored in the environment setting unit 608. Usually, a nonvolatile memory is used to keep data even if the printer is switched off.

Figure 7:
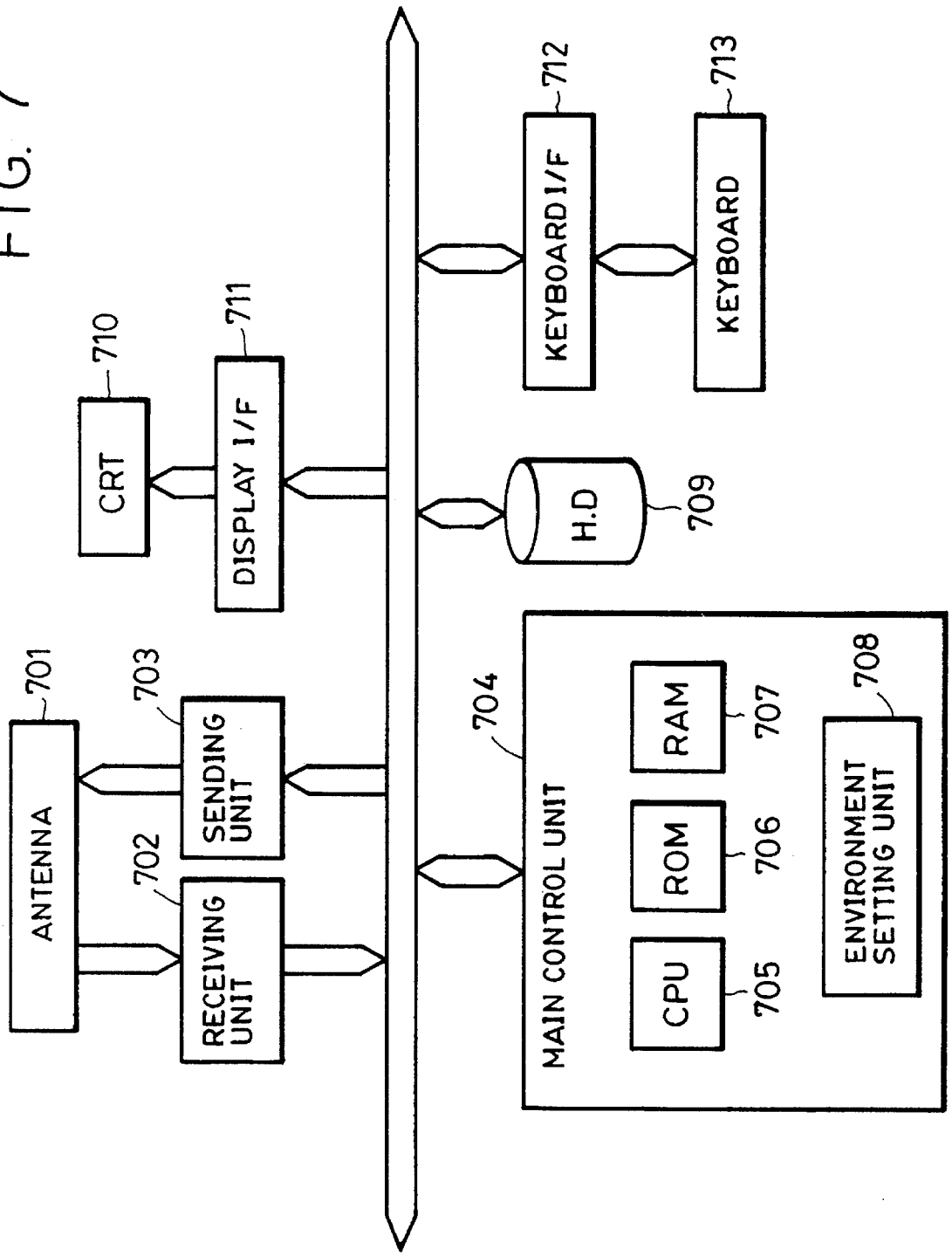
FIG. 7 is a block diagram of a communication device used in a host computer of the above mentioned printing system.

Referring to FIG. 7, the host computer having a wireless communication interface comprises: an antenna 701; a receiving unit 702; a sending unit 703; a main control unit 704; a CPU (e.g. a microprocessor) 705; ROM 706 storing a bootstrap program of the host computer; RAM (e.g. DRAM) 707 for the work area (RAM is memory into which data can be written and from which data can be read); an environment setting unit 708 including a memory, e.g. a nonvolatile memory, to store the printer's ID code and the distance data, both of which are required by the wireless communication device of the present invention; a hard disk unit 709; a display interface 711; a CRT 710; a keyboard interface 712; and a keyboard 713.

To transmit the print data of a document composed by using document composition application software (e.g. an editor), the main control unit 704, referring to the information stored in the environment setting unit 708, selects a printer in the network, and sends the print data to the sending unit 703. The print data is accordingly transmitted as serial data from the antenna 701 on radiowaves to the selected printer. The receiving unit 702 receives a status signal from the printer and sends the received signal to the main control unit 704.

In the above-described embodiments, radiowaves are used, but infrared rays, ultrasonic waves or light rays may also be used.

It is to be understood that the present invention is not limited to the disclosed embodiments but intended to cover various modifications and equivalent arrangements included within the spirit and scope of the appended claims.

What is claimed is:

1. An apparatus for transmitting print data generated by a host computer to a plurality of printers by wireless communication comprising:

selecting means for selecting one printer from the plurality of printers;

sending means for transmitting data to the selected printer;

control means for variably controlling a transmission power for said sending means to transmit the print data; and receiving means for receiving information transmitted from the printer, wherein said control means comprises memory means for storing a table including data representative of the transmission power corresponding to each printer, and sets said transmission power to the selected printer in accordance with the data representative of the transmission power corresponding to the selected printer in the table, wherein when said apparatus updates the table, said sending means sends predetermined data, which includes data representative of the transmission power of said predetermined data itself, to the selected printer, so that the selected printer can determine the transmission power for sending status data on the basis of the received data, and wherein said apparatus comprises judging means for judging whether the status data representative of correct receipt of the predetermined data is received or not by said receiving means, on the basis of the result of judgment of said judging means, updates the data representative of the transmission power corresponding to the selected printer in the table.

2. An apparatus according to claim 1, wherein when the apparatus is turned on, said selecting means selects sequentially the plurality of the printers, and said apparatus updates the data representative of the transmission power corresponding to the selected printer in the table in accordance with the result of judgment by said judging means.

3. An apparatus according to claim 1, wherein said memory means comprises a nonvolatile memory.

4. Apparatus according to claim 1, wherein said apparatus updates the data representative of the transmission power corresponding to the selected printer in said table when the transmitted print data are not correctly received by the selected printer.

5. An apparatus according to claim 4, wherein when the transmitted print data are not correctly received by the selected printer, said apparatus updates the data in accordance with a resend request from the selected printer.

6. An apparatus according to claim 1, wherein said apparatus transmits the print data to the selected printer, said apparatus updates the data representative of the transmission power corresponding to the selected printer in the table in accordance with the result of judgment by said judging means.

7. An apparatus according to claim 6, wherein said apparatus discriminates whether a status of the selected printer is ready or not when said judging means judges that the status data representative of correct receipt of the predetermined data is received, and if the status is not ready, discriminates it once again after a predetermined time.

8. An apparatus according to claim 7, wherein said apparatus sends a predetermined amount of the print data between a start bit and an end bit when the status of the selected printer is discriminated to be ready.

9. An apparatus according to claim 7, further comprising a host computer for generating the print data.

10. An apparatus for receiving print data from a print transmitter by wireless communication for printing by a printer, comprising:

receiving means for receiving the print data and predetermined data, which is transmitted prior to the print data and includes data representative of the transmission power of said predetermined data itself, transmitted by wireless communication;

judging means for judging whether said receiving means has correctly received the predetermined data;

sending means for transmitting status data representative of a judgment made by said judging means to the print transmitter;

control means for variably controlling transmission power of said sending means used for transmitting to the print transmitter, wherein said control means comprises memory means for storing a table including data representative of the transmission power of said sending means, and rewrites the table according to the data representative of transmission power of the predetermined data.

11. An apparatus according to claim 10, wherein said memory means comprises nonvolatile memory.

12. An apparatus according to claim 10, further comprising converting means for converting the print data including a character code into a dot pattern.

13. An apparatus according to claim 12, further comprising a memory being capable of storing the dot pattern converted by said converting means for one page.

14. An apparatus according to claim 12, further comprising the printer for printing the dot pattern.

* * * * *

UNITED STATES PATENT AND TRADEMARK OFFICE
CERTIFICATE OF CORRECTION

PATENT NO. : 5,490,287

DATED : February 6, 1996

INVENTOR(S) : Nobuyoshi Ito et al.

It is certified that error appears in the above-indentified patent and that said Letters Patent is hereby corrected as shown below:

ON THE TITLE PAGE

AT [56] References Cited

U.S. Patent Documents insert --3,925,782 12/1975 Anderl et al. 343/178; 4,222,188 9/1980 Dickinson et al. 455/70; 5,003,619 3/91 Morris et al. 455/69--.

Foreign Patent Documents insert --0428099 5/91 Europe; 60-261228 12/85 Japan--.

COLUMN 2

Line 42, "been" should be deleted.

UNITED STATES PATENT AND TRADEMARK OFFICE
CERTIFICATE OF CORRECTION

PATENT NO. : 5,490,287
DATED : February 6, 1996
INVENTOR(S) : Nobuyoshi Ito et al.

It is certified that error appears in the above-indentified patent and that said Letters Patent is hereby corrected as shown below:

COLUMN 5

Line 54   "Apparatus" should read --An apparatus --.

Signed and Sealed this

Twenty-fifth Day of June, 1996

Attest:

BRUCE LEHMAN

Attesting Officer   Commissioner of Patents and Trademarks